Feb. 10, 1959 H. THOMA 2,872,876
HYDROSTATIC TRANSMISSION
Filed March 21, 1955 6 Sheets-Sheet 1

INVENTOR.
HANS THOMA

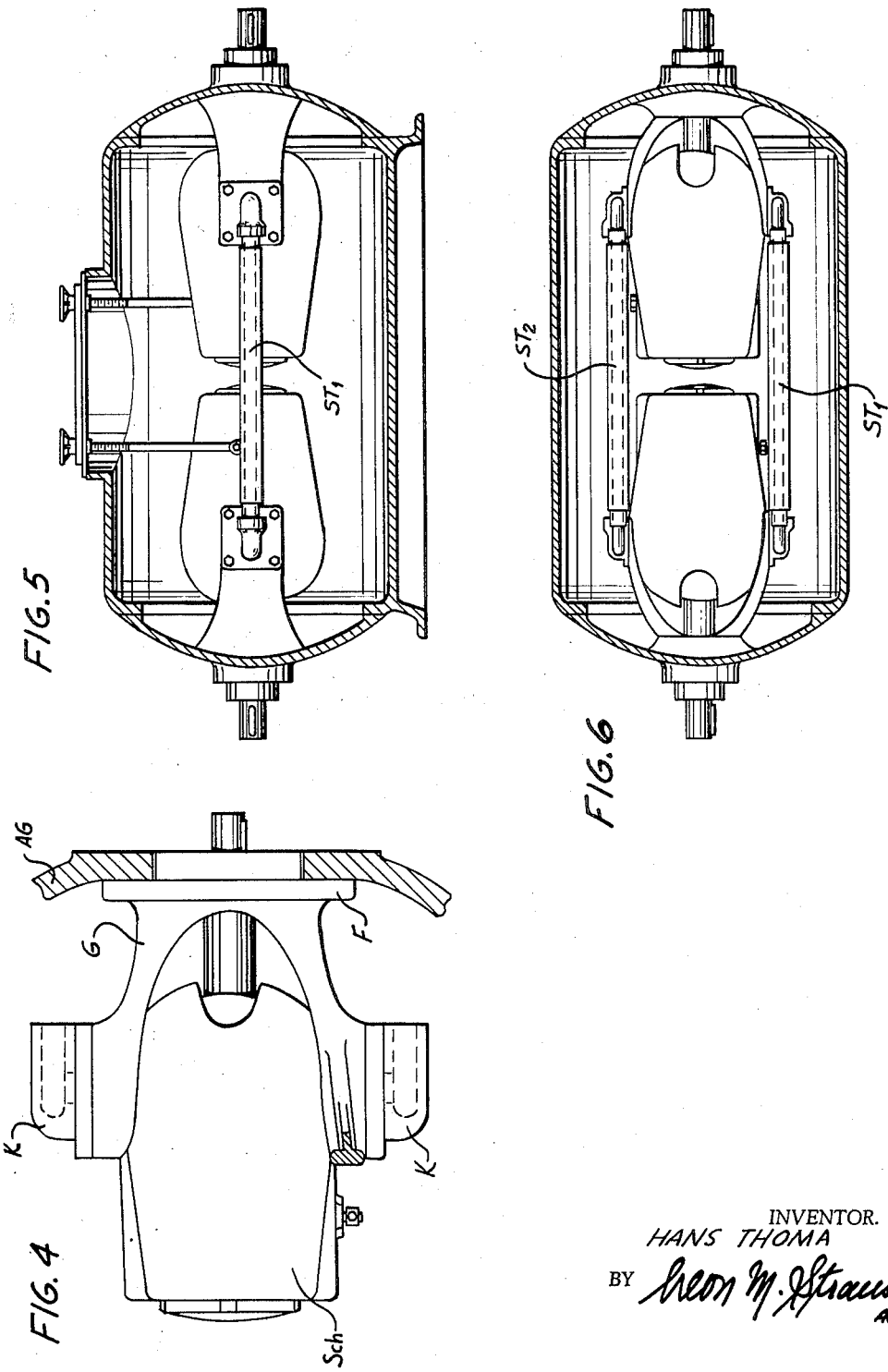

Feb. 10, 1959   H. THOMA   2,872,876
HYDROSTATIC TRANSMISSION
Filed March 21, 1955   6 Sheets-Sheet 3

INVENTOR
HANS THOMA
BY Leon M. Strauss
AGT.

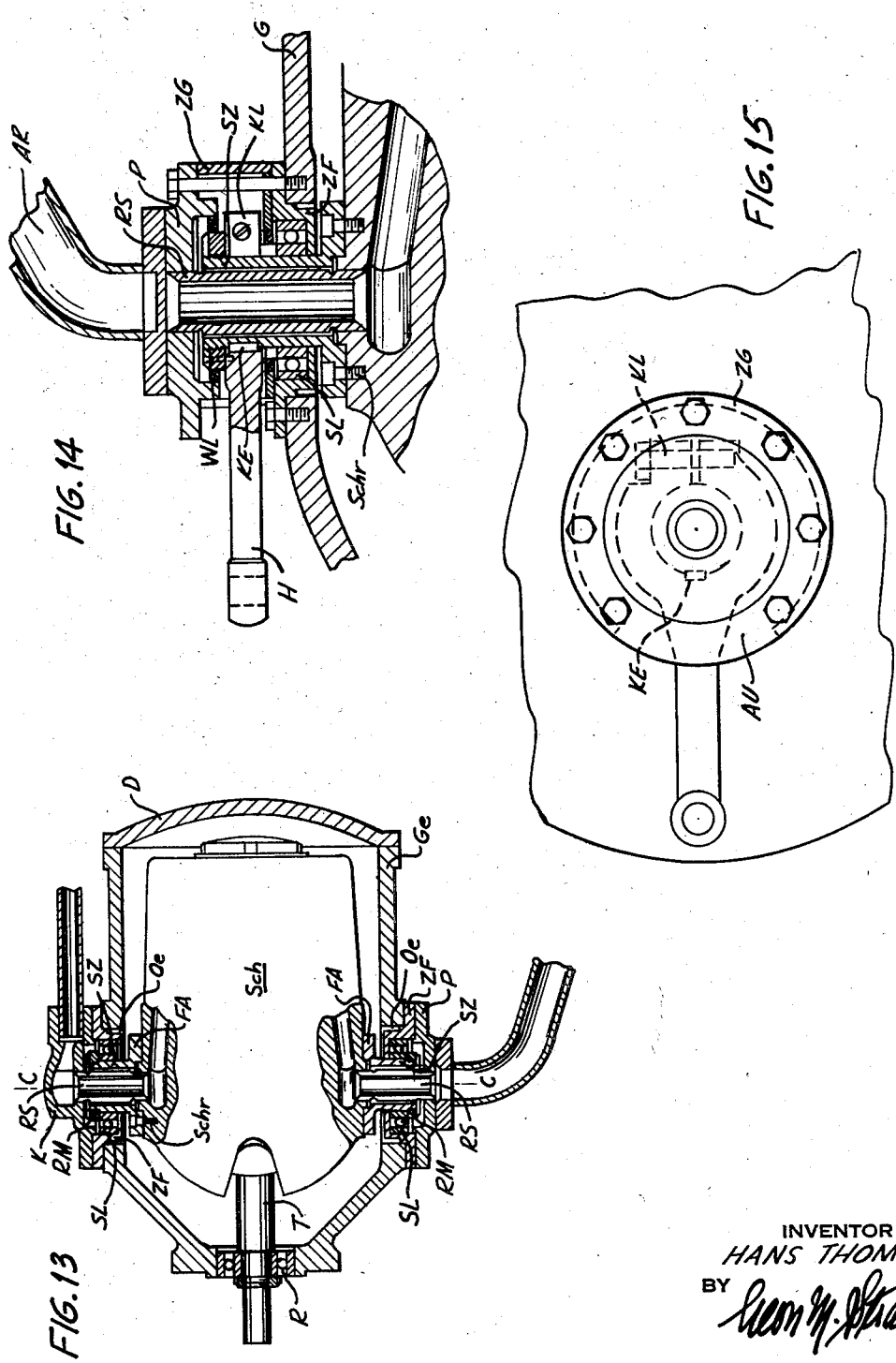

United States Patent Office 2,872,876
Patented Feb. 10, 1959

2,872,876

HYDROSTATIC TRANSMISSION

Hans Thoma, Balsthal, Switzerland

Application March 21, 1955, Serial No. 495,727

6 Claims. (Cl. 103—173)

This invention relates to hydrostatic transmission devices.

In hydrostatic transmissions which have axial pistons and are equipped with a swivelling cylinder and a driving plate rigidly secured to the drive shaft, the pistons are articulated with ball-and-socket connecting rods. In such transmissions it was customary to combine all the drive shaft bearings in one bearing housing and to arrange on the outside of the latter suspension members, such as for instance cast or bolted butt straps which, by means of pivots, support a swivel member, that carries the cylinder in such a way that the extended axis of the cylinder intersects at least approximately the drive shaft. The very troublesome noise which originates from this known design has been suppressed to a certain extent by lengthening the swivel member, which carries the cylinder and also contains the valve plate serving to distribute the oil to the individual cylinders, towards the driving plate and by designing the said swivel member so that it encloses from the rear and directly supports the drive shaft and the appurtenant bearings, including in particular a radial bearing, which are adjacent to the drive shaft.

The fact that this swivel member directly supports the drive shaft and the appurtenant bearings adjacent to same, and that further links are avoided between the bearings and the housing or an external radial bearing mounted on the housing, has enabled noise development to be suppressed to a very great extent in comparison with older designs in which, for instance, the bearings located on the drive shaft are in direct connection with the housing or with the external radial bearings of the drive shaft. Nevertheless, even with this improved design there still occurs troublesome noise which the present invention tends to suppress without involving the necessity of giving up the fundamental advantage of the separation of the bearings located on the drive shaft from the wall of the housing or of the separation of the radial bearing adjacent to the housing wall.

The present invention is based on the knowledge that the troublesome noises which frequently occur with the last-mentioned design are to be attributed to the characteristics of the housing in which the swiveling part of the transmission must usually be arranged on the drive shaft together with the external shaft bearing which is still required in some form or other. Such housings, which often serve other purposes as well, do not as a rule have the necessary rigidity to resist the play of forces which takes place between the external bearings of the drive shaft and the pivots, together with the forces of a control device.

According to the invention this difficulty is removed by the fact that the external shaft bearing, including in particular a radial bearing which is located at the same place, is directly and rigidly connected to the swivel member with the aid of suitably sturdy pivots without using the housing walls, the said pivots being arranged as a rule on the outside of the swivel member.

These and other objects of the invention will become further apparent from the following detailed description, reference being made to the accompanying drawings showing preferred embodiments of the invention.

In the drawings:

Figs. 3 and 4 are partly sectional elevational and plan views, respectively, of a modified type of transmission unit provided with adjustment means;

Figs. 5 and 6 are partly sectional elevational and plan views, respectively, of a complete transmission composed of a pump and a motor unit in operative relation relative to one another and enclosed in a housing;

Fig. 13 is a partly sectional plan view of the frame and unit shown in Fig. 12;

Fig. 14 is a fractional, partly sectional plan view of a modified type of bearing structure for supporting the transmission unit, this embodiment of the invention being characterized by a lever for controlling the adjustment of the unit; and Fig. 15 is a fractional elevational view of the bearing structure shown in Fig. 14.

Figure 1:
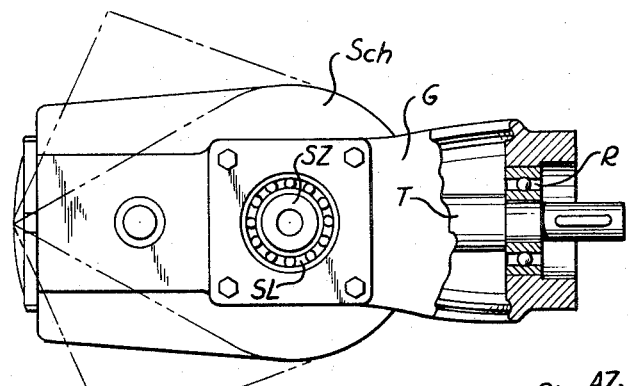
Fig. 1 is a partly sectional elevational view of a pump or motor unit constructed in accordance with the present invention and designed to be employed as part of a hydrostatic transmission.
Figure 2:
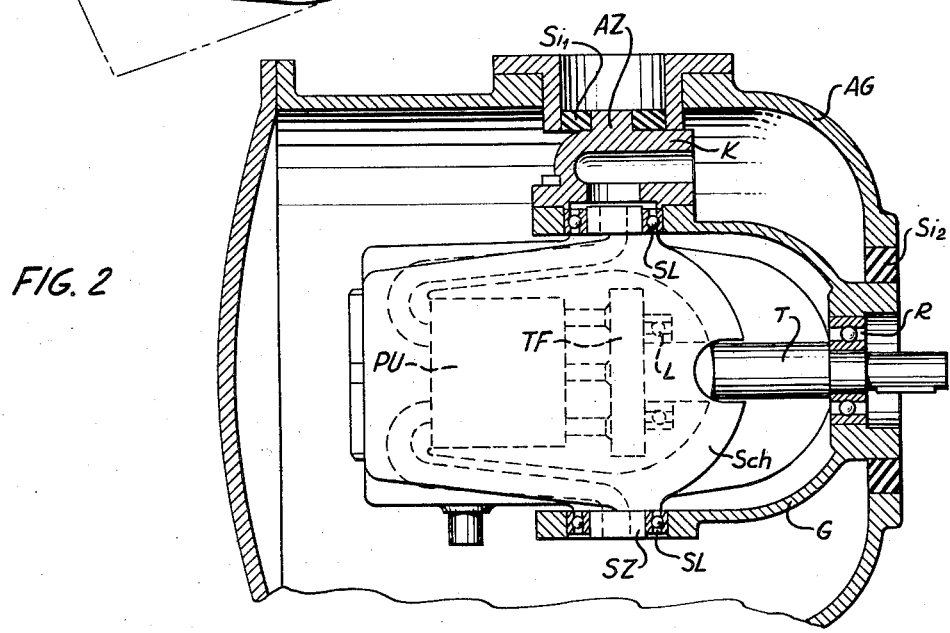
Fig. 2 is a partly sectional plan view of the transmission unit of Fig. 1.

With continuing reference to the accompanying drawings wherein like reference letters designate similar parts throughout the various views, and with initial attention to Figs. 1 and 2, there will be noted a typical embodiment of the invention. A drive shaft T is provided for a swash plate pump PU. All of the pump PU except an elongated portion of the drive shaft T is enclosed in the interior of a swivel housing Sch. The external elongated portion of drive shaft T is mounted in the radial bearing R. The inner, enclosed end of the drive shaft T, illustrated in phantom lines in Fig. 2, extends freely from the swash plate TF fixed thereto and is supported by bearings L. These bearings L are as a rule mounted in a cylindrical or spherical guide inside the swivel housing Sch, the details of the design of these bearings etc. being non-essential to the invention. In order, according to the invention, to eliminate the forces and vibrations coming from the external driving shaft radial bearing R, the latter is brought by a shell-like, cylindrical or frequently even a fork-shaped, one piece, substantially rigid, supporting and connecting member G into operative connection with two sturdy pivots SZ which are accommodated in the usual way of the outside of the swivel housing Sch. These pivots S are also very often used to convey the quantities of fluid required to operate the gear section through conduits shown in broken lines in Fig. 2 along with the cylinder block, piston rods, swash plate, etc. The pivots SZ forming parts of the swivel housing are generally supported in a pair of opposed coaxial swivel, ball or roller bearings SL which are mounted in the supporting member G operatively connected to the swivel housing Sch through pivots SZ and provide a swivel axis normal to the axis of drive shaft T. The one-piece, substantially rigid supporting and connecting member G connects the swivel bearings SL with the external radial shaft bearing R and solely forms a direct support for the radial bearing R and the pair of swivel bearings SL. Therefore the forces at play between these bearings are brought into direct connection with each other, whereby the resultant changes in form of the connecting member G are reduced to a minimum and, moreover, the outer housing walls AG of the covering means are prevented from co-vibrating. For the rest, the manner in which the suspension fork supporting or connecting member G is to be brought into connection with the outer housing AG of the covering means which will, as a rule, still be required, is non-essential to the invention. This can be arranged, for instance, by bolting a special plate-shaped, hollowed out resilient member K to the connecting member G outside of the swivel bearings SL, which member K is at the same time designed as a bend for the fluid supply and discharge piping. This member K can support on its outside the suspension pivots AZ, for instance, which will then be in operative connection with the outer housing AG via, for example, the silencer blocks $Si_1$. The outer housing can then also be used to support the external radial shaft bearing R via, for instance, a silencer block $Si_2$. In this way the connecting member G can be suspended in a known manner in a covering means so that it is to a certain extent movable.

Figure 3:
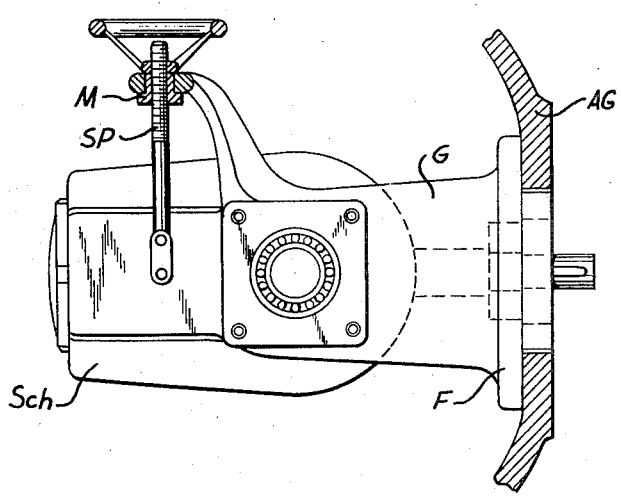
Figure 11:
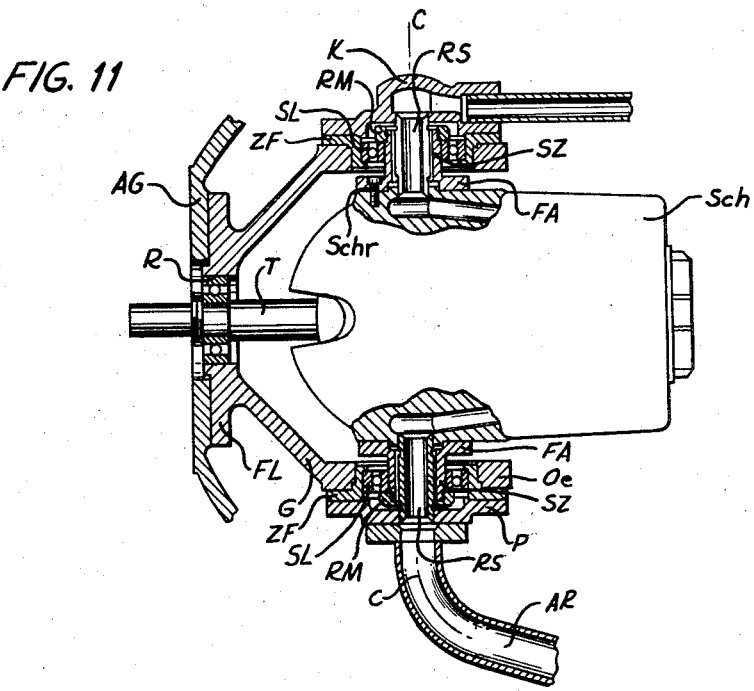
Fig. 11 is a partly sectional plan view of a transmission unit having a frame or supporting fork in which the back pressure of the hydraulic fluid acting in the direction of the swivel axis is taken up by the bearings to avoid spreading of the fork.

If, however, direct suspension of the pivots SZ is to be dispensed with, it is possible to obtain favorable results even without using such silencer blocks. This can be done, for instance, by securing to the connecting member G (Figs. 3 and 4) a flange-like member F which is connected to the outer housing wall in a manner already known. Flange-like member F and connecting member G may be integral as shown in Figs 3, 4 and 11. As a result of the direct connection of this suspension flange F to the outer housing wall and thus with the connecting member G, the swivel housing Sch will be so rigidly coupled to the radial bearing R that troublesome vibrations will be prevented from affecting the outer gear or transmission housing AG. This is also true if the connecting member G is brought into connection with the said outer housing at another point, e. g. by means of pipe lines or other structural parts which serve mechanical or hydraulic purposes. It is then possible to arrange on the connecting member G, or on a bend member K bolted to same, any desired pipe lines or components necessary for the transmissions adjusting device, e. g. a nut M which will enable the inclination of the swivel housing Sch to be adjusted by means of the manually actuatable screw SP and thus the effective piston stroke to be changed. The nut M is, for example, secured to the bend member K or to the connecting member G.

Figure 7:
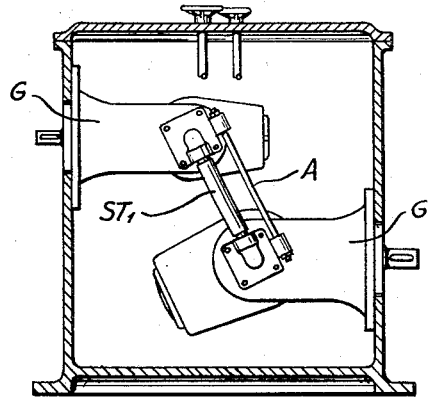
Figs. 7 and 8 are partly sectional front elevational and side elevational views, respectively, of a modified type of transmission according to the invention and including vertically spaced and staggered pump and motor units.
Figure 8:
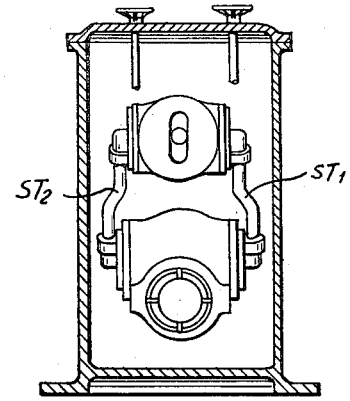

The mounting of a swiveling axial or parallel piston transmission as illustrated in the drawing, with a driving shaft bearing enclosed from the rear is as a rule so resistant to stresses and distortions that even high-pressure oil can be supplied and discharged by means of simple plug-in pipes. Figs. 5 to 8 illustrate embodiments of this type, Figs. 5 and 6 showing one in which two transmission parts act together in coaxial position and are interconnected by the plug-in pipes $ST_1$ and $ST_2$. Figs. 7 and 8, on the other hand, illustrate an arrangement in which two transmission parts with staggered axes are arranged on the connecting member G in a manner according to the invention and act together via the plug-in pipes $ST_1$ and $ST_2$. The lateral elevation in Fig. 8 shows that the plug-in pipes can also be bent; particularly in the non-coaxial arrangement of the transmission (Figs. 7 and 8), it may be appropriate to absorb the hydraulic back pressure exerted from the plug-in pipes on the connecting member G by means of special tie rods A. In all of these figures auxiliary transmission parts such as an oil supply pump, a filter and a cooler, inter alia, are not shown for the sake of simplicity and ease of understanding.

Instead of a complete transmission, consisting of a primary and secondary part such as a pump and motor combination, it is also possible to design single members, such as adjustable oil pumps or adjustable oil engines of the parallel piston type, with the suspension according to the invention. This ensures a direct connection between the swivel bearings and the external driving shaft bearings employed in the machine, the appropriate part or section can, for instance, be cut out of the complete transmission shown in Figs. 5 to 8.

Figure 9:
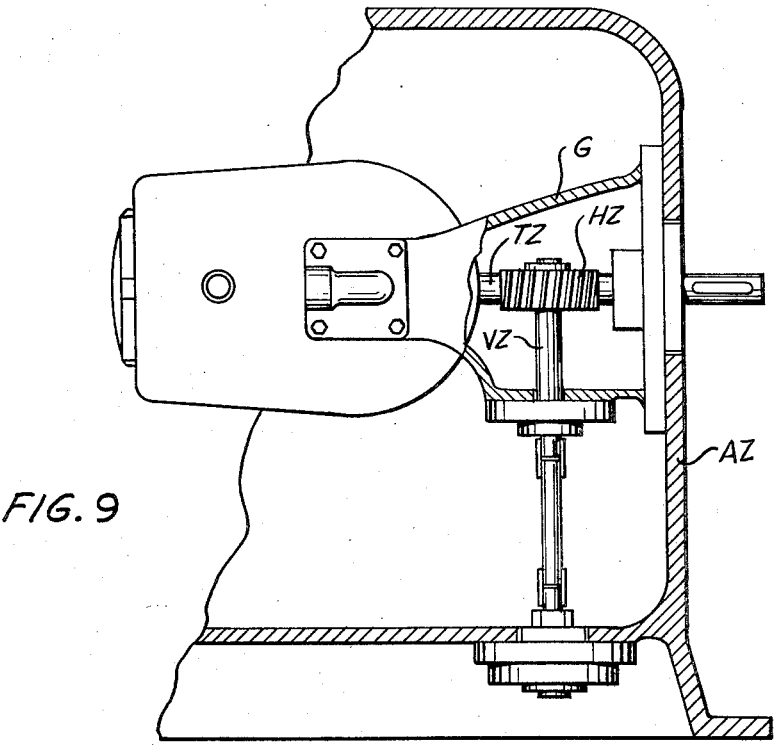
Fig. 9 is a fractional, partly sectional elevational view of a transmission as aforesaid, illustrating the manner in which a supply pump for the oil may be supported by the transmission unit supporting frame or fork and driven by the main drive shaft.

Furthermore, instead of having the simple, to a certain extent open connecting member G as shown in Figs. 1 and 2, the connecting member G can also be designed as a more or less enclosed hollow body. This may be particularly advantageous if it is desired to secure other components to the connecting member G. Fig. 9 illustrates by way of example an embodiment of this type in which a helical gear drive HZ for an auxiliary machine, e. g. an auxiliary oil pump (not shown), is arranged in the open part of the drive shaft TZ which is provided within the connecting member G. The auxiliary oil pump can here be directly mounted on the connecting member G or also, by means of a suitable vertically extending shaft VZ, in the lower part of the outer housing AZ containing the oil filling for the transmission concerned.

The details of the design illustrated are not essential to the invention; what is essential is rather the connection of the external radial bearing, or also the combined radial and axial bearing on the driving shaft with the pivots on the swivel housing. The arrangement can be chosen such that this direct connection is also utilized to intercept the axial forces at work in the axial or parallel piston machine wholly or partly by means of the external bearing R with a view to relieving, to a greater or lesser extent, the bearings arranged inside the swivel housing.

Furthermore, instead of the horizontal swivel axes illustrated in the drawings, vertical or inclined arrangements may also be chosen without thereby altering anything essential to the invention.

Figure 10:
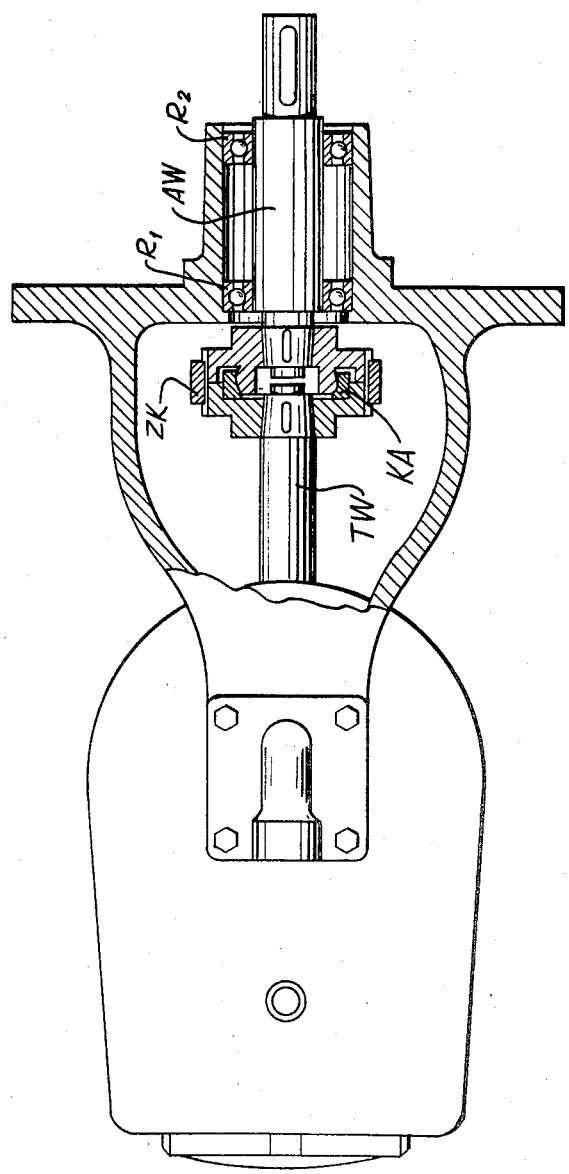
Fig. 10 is a partly sectional elevational view of a modified type of supporting frame or fork designed, in accordance with the present invention, for use with a multi-sectioned drive shaft including a clutch.

Finally, it is also possible to replace the radial bearing R, mounted directly on the drive shaft (Fig. 1), by a bearing which acts indirectly. In this connection Fig. 10 shows an embodiment in which the inner section TW of a sectioned drive shaft carries on its external end a coupling member KA which is supported inside on a spherical surface arranged on an external drive shaft section AW. A gear coupling ZK, which engages in teeth on the coupling member KA and in teeth on the appurtenant spherical section of the drive shaft section AW, ensures the transmission of the torque. In this case, therefore, the radial bearing R in Fig. 1 is replaced by one or several radial bearings $R_1$ and $R_2$ on the outer extension AW of the drive shaft section TW, without thereby changing the direct connection of the radial bearings R, or $R_1$ and $R_2$ in Fig. 10, with the pivots on the swivel housing while still eliminating noises and vibrations that originate in the said external bearing if the latter is not directly connected according to the invention by suitable pivots to the actual swivel housing, although the said swivel housing already contains in its interior at least one bearing for the driving shaft section TW.

The manner, described above, of suspending a transmission part in a suspension fork connecting member still has the disadvantage that in most types of transmissions the normal conduction of the pressure fluid in the neighbourhood of the swivel axis bearing exerts strong forces of reaction on the suspension in the direction of the swivel axis. This generally causes the suspension components to be forced apart or spread and they must therefore be very sturdily designed.

This drawback is removed according to the invention by designing the swiveling component so that it is capable of absorbing these spreading forces acting in the direction of the swivel axis.

Fig. 11 illustrates an appropriate embodiment of the invention. Sch is the swivel housing of a component which swivels about the axis C—C the drive shaft T of which, besides being mounted in the bearings located inside the component and not visible in the illustrations, is also mounted at its left-hand end in the external bearing R. The latter, as already described, is directly connected by means of the bearing supporting member G to the swivel bearings SL along the axis C—C and the entire supporting member G, which carries these three bearings, can then be connected by means of the flange FL to the wall AG of an outer housing or supporting pedestal, as has already been described.

In the embodiment shown in Fig. 11, each pressure fluid transfer member consists of a tubular piece RS, the ends of which are of cylindrical or other configuration and fit tightly into the swivel housing Sch, on the one hand, and into the pipe connecting bend K on the other hand, or into a plate P which is as a rule linked to the connecting pipe AR. Such and similar pressure fluid transfer member or stuffing boxes produce powerful forces acting in the direction of the swivel axis C—C on the free end portions of the bifurcated supporting member G; these forces are pressure forces which tend to spread the said member. In order to keep the said forces away from the supporting member G, the swivel bearings SL are so arranged according to the invention that they can absorb these spreading, longitudinal forces.

In the embodiment according to Fig. 11 the swivel bearings SL are, by way of example, designed as ball bearings or also as roller bearings so that they can take up longitudinal forces as well. A hook-shaped, profiled intermediate flange ZF or any device having a similar action transmits the spreading forces which act on the supporting member G, via the annular nut RM to the pivot SZ which, by way of example, is connected to the swiveling component by means of screws Schr extending through a flange FA.

By suitably tightening the annular nut RM, the suspension described obviously enables a spreading of the supporting member G to be prevented or reduced to a small amount, the magnitude of which will depend on the resilience of the ball bearings SL and of other structural parts. The entire supporting member G, as will be seen from Fig. 11, can therefore be largely cut out and the other supporting structures, such as collars or gate-shaped members etc. which are resistant to bending and are otherwise required for the absorption of the spreading forces, can be avoided.

If suitable spacing collars are fitted between the ball bearings SL and the flange FA on the pivot SZ or if the said pivot is provided with shoulders, not only can the spreading forces be absorbed, but also forces acting in the opposite direction. This may be of advantage in some designs of the swivel housing Sch, e. g. for the additional purpose of using both the ball bearings SL for the absorption of the forces originating in the stuffing boxes or other forces such as the effects of weight.

As can be seen from Figs. 11 to 15, the suspension designed to take up the spreading forces turns out to be longer in the direction of the swivel axis than the conventional design which only allows pressure forces at the swivel bearings to be transmitted to the transmission unit or part Sch. It is therefore often advantageous for the practical embodiment of the invention to design the actual pivots SZ in the manner shown in Fig. 11, so that they can be released from the swivel housing Sch, possibly by means of the flange FA and the screws Schr. It is, indeed, possible and most advantageous to arrange the swivel housing Sch in the supporting member G without the pivots SZ to begin with, and only afterwards to insert the pivots SZ in the supporting member G through the openings Oe and to secure them to the swivel housing Sch, possibly by means of the screws Schr. The supporting member G can thus be made fairly narrow.

Figure 12:
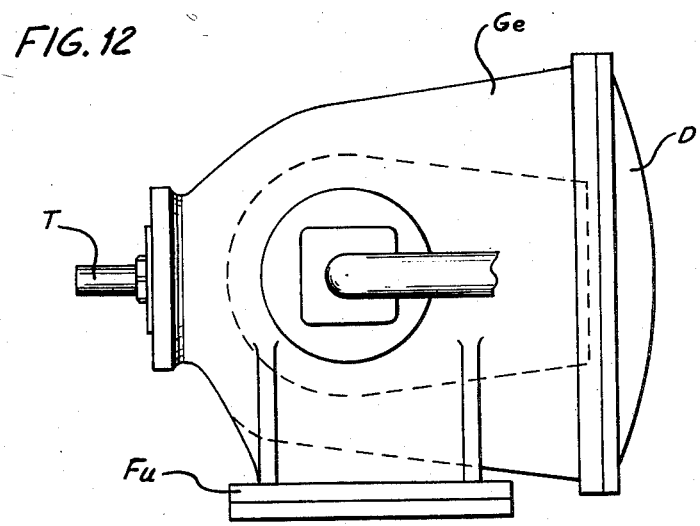
Fig. 12 is an elevational view of a transmission unit similar to that shown in Fig. 11 but modified by having the fork constructed as a closed housing rather than as an open frame.

Particularly if the pivot bearings SL are arranged in the manner stated for the absorption of the tension likely to be exerted on the swiveling component, it is possible, without any harmful development of noise, to enlarge the bearing supporting member G of Fig. 11 so as to form a complete housing serving for one or several transmission parts, and then, possibly, to omit the clamping flange FA which can be seen in Fig. 11. Figs. 12 and 13 show an appropriate embodiment of the invention which in most of its parts is similar to the embodiment illustrated in Fig. 11 and is designated in the same way. In the embodiment according to Figs. 12 and 13, however, the bearing supporting member G of Fig. 11 has been enlarged to form a complete outer housing Ge which, by way of example, is supported on the foundation by the feet Fu preferably integral with the housing and replacing the housing AG shown in Figs. 1 to 14. This outer housing is closed by a cover D and may even be filled with oil, unless it is preferred to replace the cover by the often required second transmission part or unit, which generally serves as secondary part or oil machine, i. e. as a motor, and is connected either in a coaxial position in respect of the drive shaft T or in some other position.

This embodiment can be employed to absorb the spreading forces without any troublesome production of noise particularly when the swivel bearings SL are used, because it is precisely the spreading forces occurring at a housing wall which would cause the said wall to vibrate and produce noise.

The invention, moreover, is based on the consideration that when a swiveling transmission part with a separate external bearing for the drive shaft is employed, very troublesome noises are produced if the said section is simply inserted in a housing with the conventional swivel bearings which only transmit compressive forces to the housing in the direction of the swivel axis. It is therefore necessary, according to the invention, to connect the swivel bearings and the appurtenant stuffing box members, which produce the longitudinal forces, to the external bearing independently of the housing walls, so as to form a rigid bearing connecting member, and, if it is desired to connect the housing walls to the bearing connecting member, to design the latter so that, by suitable arrangement of the swivel bearing, it can also transmit tension to the swiveling gear section.

The swivel bearing according to the invention, particularly the one with releasable pivot, is also extremely suitable for transmitting the control drive for the swiveling component from a housing with the aid of an extended pivot SZ (cf. Figs. 14 and 15). The said pivot SZ supports the lever H which penetrates the side of the swivel bearing housing ZG through a suitable opening AU. Two shaft packings WL provide the necessary sealing. For the rest, this swivel bearing is designed similar to those already described and its corresponding parts are therefore designated in the same way as in the other figures. A clamping screw KL or also other precautionary devices, such as for instance keys KE, serve to hold the lever H in position on the pivot SZ which is of appropriate length to accommodate all these elements.

According to the present invention there is provided in a hydrostatic transmission a swash plate fixed to one end of a drive shaft extending freely from the swash plate. A swivel housing encloses in its interior all of the pump except an elongated portion of the drive shaft. A pair of coaxial swivel bearing means are operatively connected to the swivel housing and provide therefor a swivel axis normal to the axis of the drive shaft. An outer radial bearing is operatively connected to the elongated portion of the drive shaft and is located beyond the swivel housing. A one-piece substantially rigid member connects this radial bearing to the pair of swivel bearing means and forms the sole direct support for the radial bearing and the pair of swivel bearing means.

Various changes and modifications may be made without departing from the spirit and scope of the present invention and it is intended that such obvious changes and modifications be embraced by the annexed claims.

Having thus described the invention, what is claimed as new and desired to be secured by Letters Patent, is:

1. In a hydrostatic transmission; a swash plate pump including a swash plate fixed to one end of a drive shaft extending freely from said swash plate, covering means including a swivel housing enclosing in its interior all of said pump except an elongated portion of said drive shaft, a pair of opposed, coaxial swivel bearing means operatively connected to said housing and providing therefor a swivel axis normal to the axis of said drive shaft, an outer radial bearing operatively connected to said elongated portion of said drive shaft beyond said swivel housing, a one-piece substantially rigid member connecting said radial bearing to said pair of swivel bearing means solely forming a direct support for said radial bearing and said pair of swivel bearing means, and means for connecting said one-piece member with said covering means.

2. In a hydrostatic transmission according to claim 1, said covering means forming an outer housing enclosing said swivel housing and said one-piece member.

3. In a transmission according to claim 2, said means connecting said one-piece member to said outer housing being resilient.

4. In a transmission according to claim 2, said outer housing being in the form of a flange integral with said one-piece member, forming part of the latter, and fixed to said outer housing.

5. In a transmission according to claim 1, said one-piece member forming part of an outer housing having walls, which enclose said swivel housing, and means connected to said swivel bearing means and said walls of said outer housing for absorbing forces which tend to deform said walls.

6. In a transmission according to claim 1, said one-piece member being bifurcated and having a pair of free end portions respectively located next to said pair of swivel bearing means, and means connected to said pair of swivel bearing means and said free end portions of said one-piece member for absorbing forces which tend to spread said free end portions apart from each other.

References Cited in the file of this patent

UNITED STATES PATENTS

| | | |
|---|---|---|
| 2,095,316 | Davis | Oct. 12, 1937 |
| 2,471,812 | Christiano | May 31, 1949 |
| 2,476,515 | Stevens | July 19, 1949 |

FOREIGN PATENTS

| | | |
|---|---|---|
| 142,313 | Australia | July 18, 1951 |
| 144,649 | Sweden | Mar. 23, 1954 |